(12) United States Patent
Chu et al.

(10) Patent No.: US 11,799,523 B2
(45) Date of Patent: Oct. 24, 2023

(54) GROUP ACKNOWLEDGEMENT FOR MULTIPLE USER COMMUNICATION IN A WIRELESS LOCAL AREA NETWORK

(71) Applicant: NXP USA, INC., Austin, TX (US)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/663,954

(22) Filed: May 18, 2022

(65) Prior Publication Data
US 2022/0278716 A1 Sep. 1, 2022

Related U.S. Application Data

(63) Continuation of application No. 16/910,989, filed on Jun. 24, 2020, now abandoned, which is a
(Continued)

(51) Int. Cl.
*H04L 1/02* (2006.01)
*H04B 7/0452* (2017.01)
(Continued)

(52) U.S. Cl.
CPC ............ *H04B 7/0452* (2013.01); *H04J 11/00* (2013.01); *H04L 1/16* (2013.01); *H04L 1/1614* (2013.01);
(Continued)

(58) Field of Classification Search
CPC .............. H04L 1/11621; H04L 5/0055; H04L 12/1868; H04L 1/1671; H04L 1/16;
(Continued)

(56) References Cited

U.S. PATENT DOCUMENTS 9,680,608 B2 *  6/2017  Ruijter ................. H04L 1/0083
2011/0235593 A1   9/2011  Gong et al.
(Continued)

FOREIGN PATENT DOCUMENTS

WO    2006091809 A2    8/2006

OTHER PUBLICATIONS

In the Matter of Certain Integrated Circuits, Chipsets, and Electronic Devices, and Products Containing the Same, "Redacted Respondents' Invalidity Contentions for U.S. Pat. Nos. 7,593,202; 8,482,136; 8,558,591; 9,729,214; and 10,904,058", in the United States International Trade Commission, Washington, D.C., Investigation No. 337-TA-1287, Mar. 9, 2022.
(Continued)

*Primary Examiner* — Khai Tran

(57) ABSTRACT

In a method for simultaneously communicating with multiple communication devices in a wireless local area network a first communication device receives a plurality of uplink data units simultaneously transmitted by multiple second communication devices. The first communication device generates an acknowledgement data unit to acknowledge receipt of the multiple data units simultaneously transmitted by multiple second communication devices. The acknowledgement data unit includes (i) an indication that indicates that the acknowledgement data unit is intended for multiple second communication devices and (ii) respective acknowledgement information for the multiple second communication devices. The acknowledgement data unit is transmitted from the first communication device to the multiple second communication devices.

15 Claims, 10 Drawing Sheets

Related U.S. Application Data continuation of application No. 15/670,536, filed on Aug. 7, 2017, now Pat. No. 10,707,928, which is a continuation of application No. 14/808,932, filed on Jul. 24, 2015, now Pat. No. 9,729,214.

(60) Provisional application No. 62/165,789, filed on May 22, 2015, provisional application No. 62/115,371, filed on Feb. 12, 2015, provisional application No. 62/028,559, filed on Jul. 24, 2014.

(51) Int. Cl.
*H04L 1/1607* (2023.01)
*H04L 1/1829* (2023.01)
*H04L 27/26* (2006.01)
*H04L 5/00* (2006.01)
*H04J 11/00* (2006.01)
*H04L 1/16* (2023.01)
*H04W 84/12* (2009.01)

(52) U.S. Cl.
CPC .......... *H04L 1/1621* (2013.01); *H04L 1/1861* (2013.01); *H04L 5/0055* (2013.01); *H04L 27/2628* (2013.01); *H04W 84/12* (2013.01)

(58) Field of Classification Search
CPC ... H04L 27/2631; H04L 47/10; H04L 1/1628; H04B 7/0452; H04B 7/005; H04B 7/0617; H04W 84/12
USPC .......................................... 375/267, 260, 262
See application file for complete search history.

(56) References Cited

U.S. PATENT DOCUMENTS

| | | |
|---|---|---|
| 2012/0314697 A1 | 12/2012 | Noh et al. |
| 2013/0223338 A1* | 8/2013 | Asterjadhi ............ H04L 1/1614 370/328 |
| 2013/0230059 A1 | 9/2013 | Quan et al. |
| 2013/0301569 A1 | 11/2013 | Wang et al. |
| 2014/0198872 A1* | 7/2014 | Barriac ................. H04L 1/1621 375/285 |
| 2015/0063190 A1* | 3/2015 | Merlin .................. H04L 1/0061 370/312 |
| 2015/0103767 A1* | 4/2015 | Kim ...................... H04W 74/06 370/329 |
| 2015/0288427 A1* | 10/2015 | Wang .................... H04B 7/024 370/329 |
| 2015/0288501 A1* | 10/2015 | Kwon ................... H04L 5/0007 370/329 |
| 2016/0088602 A1 | 3/2016 | Seok |
| 2017/0171878 A1 | 6/2017 | Chun et al. |

OTHER PUBLICATIONS

*Mediatek, Inc., et al.* vs. *NXP Semiconductors N.V., et al.*, Appendix D-1, "Invalidity of U.S. Pat. No. 9,729,214 (the '214 Patent) Based on Noh", United States District Court, Central District of California, Case No. 2:21-cv-4969-GW-AFM.

*Mediatek, Inc., et al.* vs. *NXP Semiconductors N.V., et al.*, Appendix D-2, "Invalidity of U.S. Pat. No. 9,729,214 (the '214 Patent) Based on Wang", United States District Court, Central District of California, Case No. 2:21-cv-4969-GW-AFM.

*Mediatek, Inc., et al.* vs. *NXP Semiconductors N.V., et al.*, Appendix D-3, "Invalidity of U.S. Pat. No. 9,729,214 (the '214 Patent) Based on Chun", United States District Court, Central District of California, Case No. 2:21-cv-4969-GW-AFM.

*Mediatek, Inc., et al.* vs. *NXP Semiconductors N.V., et al.*, Appendix D-4, "Invalidity of U.S. Pat. No. 9,729,214 (the '214 Patent) Based on Gong", United States District Court, Central District of California, Case No. 2:21-cv-4969-GW-AFM.

* cited by examiner

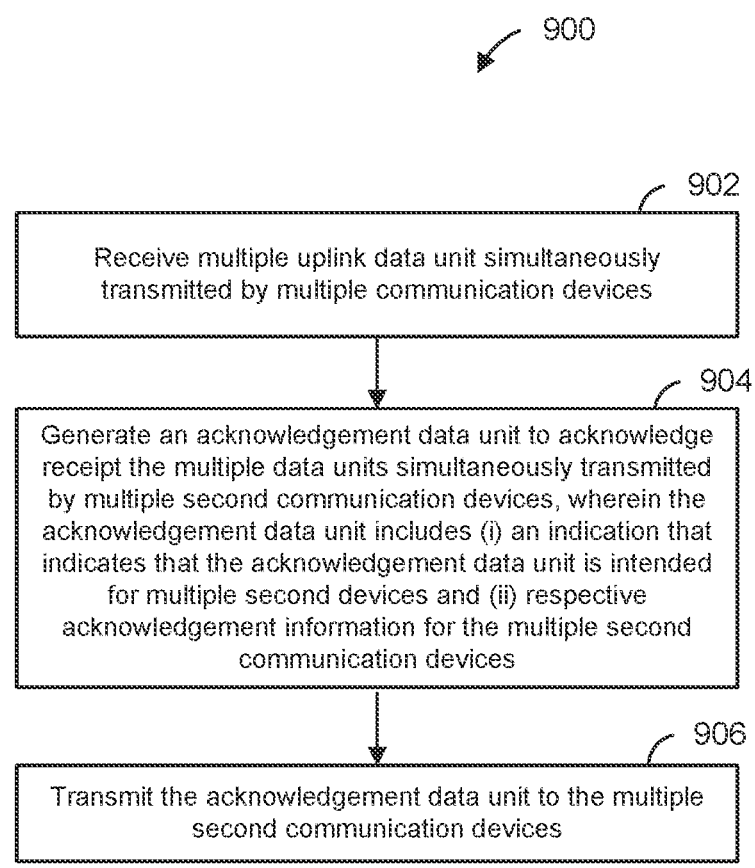

GROUP ACKNOWLEDGEMENT FOR MULTIPLE USER COMMUNICATION IN A WIRELESS LOCAL AREA NETWORK

CROSS-REFERENCE TO RELATED APPLICATION

This application is a continuation application of U.S. patent application entitled "GROUP ACKNOWLEDGEMENT FOR MULTIPLE USER COMMUNICATION IN A WIRELESS LOCAL AREA NETWORK'"", having a Ser. No. 16/910,989, having a filing date of Jun. 24, 2020; which is a continuation application of U.S. patent application entitled "GROUP ACKNOWLEDGEMENT FOR MULTIPLE USER COMMUNICATION IN A WIRELESS LOCAL AREA NETWORK", having a Ser. No. 15/670,536, having a filing date of Aug. 7, 2017; which is a continuation of U.S. patent application entitled "GROUP ACKNOWLEDGEMENT FOR MULTIPLE USER COMMUNICATION IN A WIRELESS LOCAL AREA NETWORK", having a Ser. No. 14/808,932, having a filing date of Jul. 24, 2015; which claims the benefit of the U.S. provisional application entitled "GROUP ACKNOWLEDGE DESIGN FOR UL MU MIMO/OFDMA", having a Ser. No. 62/165,789, and having a filed date of May 22, 2015; and which claims the benefit of the U.S. provisional application entitled "GROUP ACKNOWLEDGE DESIGN FOR UL MU MIMO/OFDMA", having a Ser. No. 62/115,371, and having a filed date of Feb. 12, 2015; and which claims the benefit of the U.S. provisional application entitled "GROUP ACKNOWLEDGE DESIGN FOR UL MU MIMO/OFDMA", having a Ser. No. 62/028,559, and having a filed date of Jul. 24, 2014, having common inventors, and having a common assignee, all of which is incorporated by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to support both downlink (DL) and uplink (UL) multi-user (MU) transmissions, such as orthogonal frequency division multiple access (OFDMA) transmissions and multi-user multiple input multiple output (MU-MIMO) transmissions, and to provide even greater throughputs, such as throughputs in the tens of Gbps range.

SUMMARY

In an embodiment, a method for simultaneously communicating with multiple communication devices in a wireless local area network includes receiving, at a first communication device, a plurality of uplink data units simultaneously transmitted by multiple second communication devices. The method also includes generating, at the first communication device, an acknowledgement data unit to acknowledge receipt of the multiple data units simultaneously transmitted by multiple second communication devices, wherein the acknowledgement data unit includes (i) an indication that indicates that the acknowledgement data unit is intended for multiple second communication devices and (ii) respective acknowledgement information for the multiple second communication devices. The method additionally includes causing the acknowledgement data unit to be transmitted from the first communication device to the multiple second communication devices.

BRIEF DESCRIPTION OF THE DRAWINGS

FIG. 9 is a flow diagram of an example method that is implemented by an AP in a WLAN, according to an embodiment.

DETAILED DESCRIPTION

Figure 1:
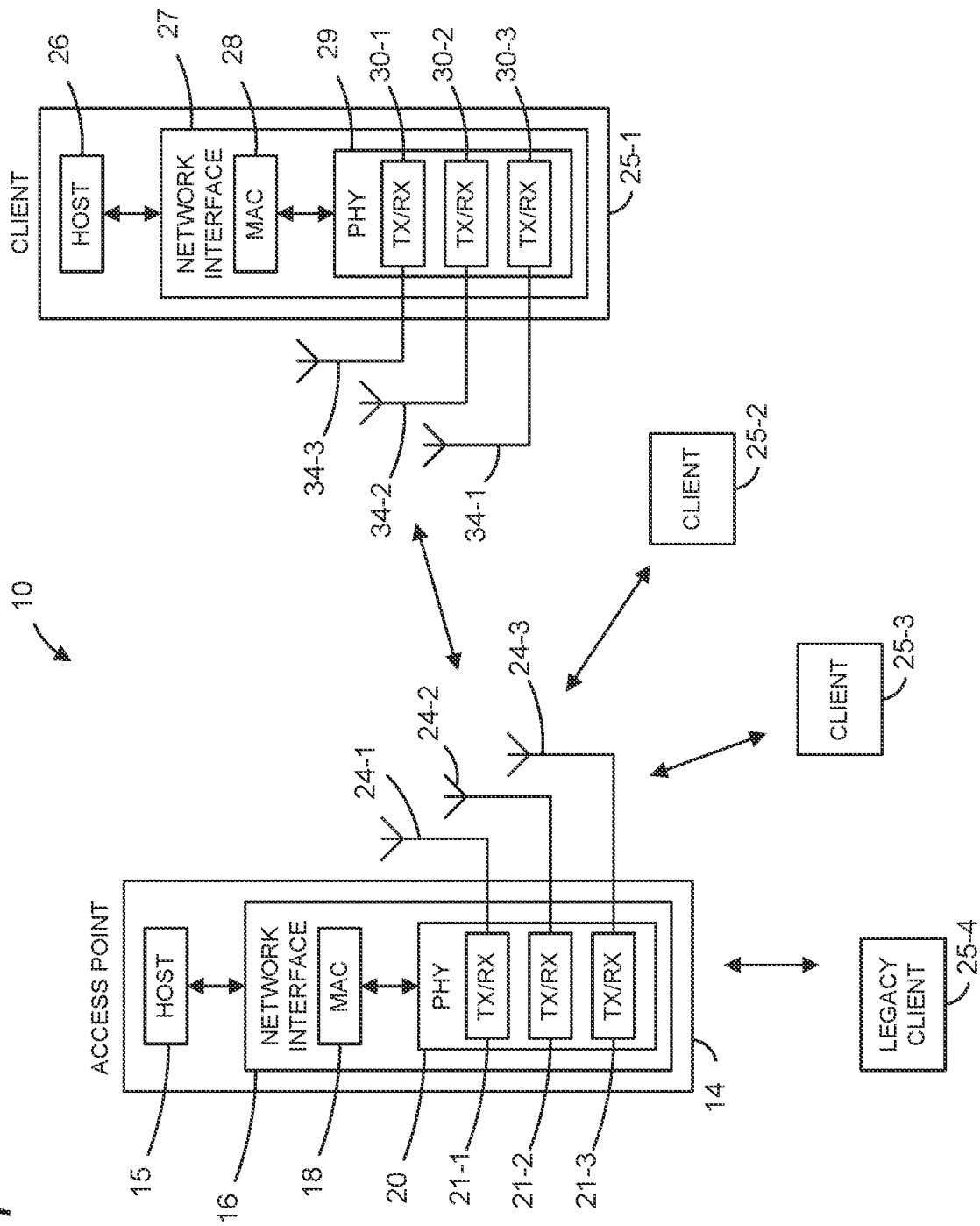
FIG. 1 is a block diagram of an example wireless local area network (WLAN), according to an embodiment.

In embodiments described below, a wireless network device such as an access point (AP) of a wireless local area network (WLAN) simultaneously transmits independent data streams to multiple client stations and/or receives independent data streams simultaneously transmitted by multiple client stations. For example, the AP transmits data for the multiple clients in different orthogonal frequency division multiplexing (OFDM) sub-channels of an orthogonal frequency division multiple access (OFDMA) transmission, in an embodiment. Similarly, multiple client stations transmit data to the AP simultaneously, in particular, each client station transmits data in a different OFDM sub-channel of an OFDMA transmission, in an embodiment. In another embodiment, the AP transmits data for multiple client stations using different spatial streams of a multi-user multiple input multiple output (MU-MIMO) transmission. Similarly, multiple client stations transmit data to the AP simultaneously using different spatial streams within an MU-MIMO transmission to the AP, in an embodiment.

In an embodiment, upon receiving simultaneous transmissions from multiple client stations, the AP acknowledges receipt of the simultaneous transmissions by transmitting one or more acknowledgement frames to the client stations. For example, in an embodiment, the AP transmits an OFDMA acknowledgement frame that includes respective acknowledgements intended for different client stations in different OFDM sub-channels, in an embodiment. In another embodiment, the AP transmits an MU-MIMO acknowledgment frame that includes respective acknowledgements intended for different client stations transmitted in different spatial streams. In yet another embodiment, the AP transmits a broadcast acknowledgement frame that is broadcast to the multiple client stations and includes the respective acknowledgements intended for the multiple client stations, or a multicast acknowledgement frame that is multicast to the multiple client stations and includes the respective acknowledgements intended for the multiple client stations. The AP acknowledges receipt of simultaneous transmissions from multiple client stations in other suitable manners, in other embodiments.

The AP is configured to operate with client stations according to at least a first communication protocol. The first communication protocol is sometimes referred to herein as "high efficiency WiFi," "high efficiency WLAN," "HEW" communication protocol, or IEEE 802.11ax Standard. The first communication protocol supports OFDMA communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11g, IEEE 802.11n, and/or IEEE 802.11ac) are collectively referred herein as "legacy" communication protocols. The legacy communication protocols do not support OFDMA communication, in an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Addition ally, two or more of the client stations 25 are configured to transmit corresponding data streams to the AP 14 such that the AP 14 receives the data streams simultaneously.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

According to an embodiment, the client station 25-4 is a legacy client station that is not enabled to receive a data stream that is transmitted by the AP 14 simultaneously with other independent data streams as part of an OFDMA transmission to multiple client stations 25. Similarly, according to an embodiment, the legacy client station 25-4 is not enabled to transmit a data stream that to the AP 14 as part of OFDMA transmission from multiple client stations 25. According to an embodiment, the legacy client station 25-4 includes a PHY processing unit that is generally capable of receiving a data stream that is transmitted by the AP 14 simultaneously with other independent data streams that are intended for other client stations 25. But the legacy client station 25-4 includes a MAC processing unit that is not enabled with MAC layer functions that support receiving the data stream that is transmitted by the AP 14 simultaneously with other independent data streams that are intended for other client stations 25. According to an embodiment, the legacy client station 25-4 includes a PHY processing unit that is generally capable of transmitting a data stream to the AP 14 at the same time that other client stations 25 transmit data to the AP 14. But the legacy client station 25-4 includes a MAC processing unit that is not enabled with MAC layer functions that support transmitting a data stream to the AP 14 at the same time that other client stations 25 transmit data to the AP 14.

Figure 2:
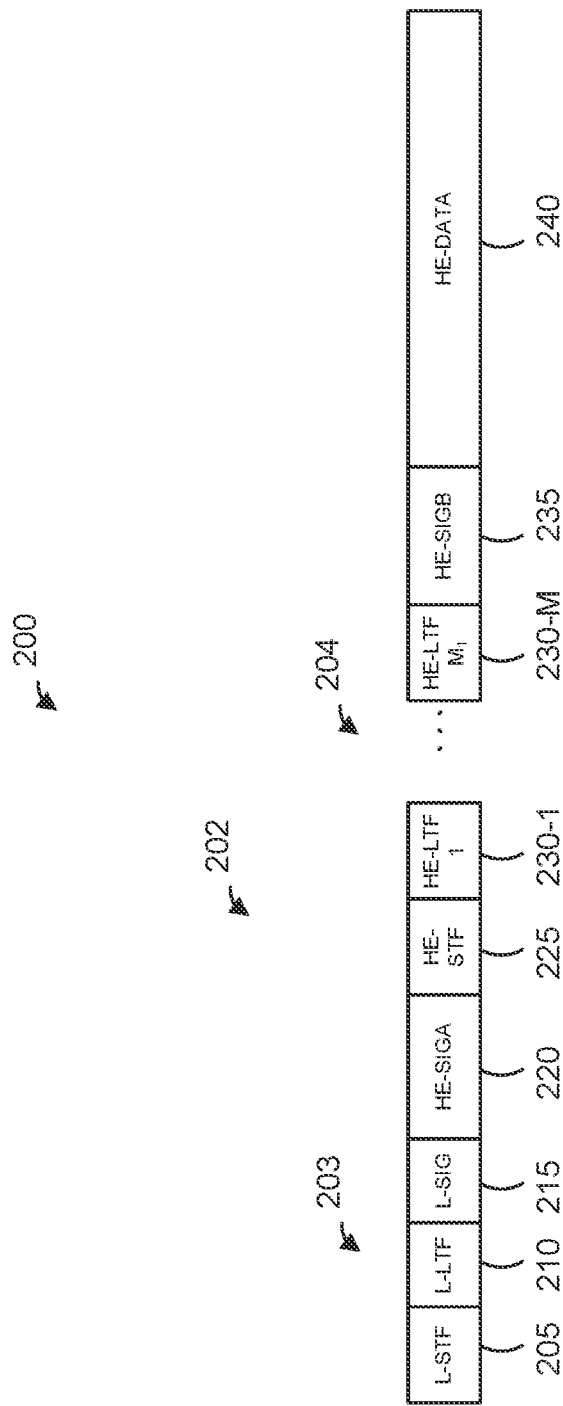
FIG. 2 is a diagram of an example data unit, according to an embodiment.

FIG. 2 is a diagram of a physical layer data unit 200, according to an embodiment. The AP 14 is configured to transmit to a client station (e.g., the client stations 25-1) via orthogonal frequency domain multiplexing (OFDM) modulation, according to an embodiment. In an embodiment, the client station 25-1 is also configured to transmit the data unit 200 to the AP 14. The data unit 200 conforms to the HEW communication protocol, in the illustrated embodiment. The data unit 200 conforms to a legacy communication protocol such as the IEEE 802.11a Standard, the IEEE 802.11g Standard, the IEEE 802.11n Standard or the IEEE 802.11ac Standard, in some embodiments. In such embodiments, one or more fields of the data unit 200 is/are replaced by corresponding fields that conform to the legacy communication protocol.

The data unit 200 includes a preamble 202, which, in turn, includes a legacy preamble portion 203 and a high efficiency (HE) preamble portion 204. The legacy preamble portion 202 includes an L-STF 205, an L-LTF 210, and an L-SIG 215. The HE preamble portion 204 includes one or more HE signal field (s) (HE-SIGA (s)) 220, an HE short training field (HE-STF) 225, MHE long training fields (HE-LTFs) 230, where M is an integer, and an HE signal field B (HE-SIGB) 235. Each of the L-STF 205, the L-LTF 210, the L-SIG 215, the HE-SIGAs 220, the HE-STF 225, the M HE-LTFs 230, and the HE-SIGB 235 comprises an integer number of one or more OFDM symbols. For example, in an embodiment, the HE-SIGAs 220 comprise two OFDM symbols, and the HE-SIGB field comprises one OFDM symbol, in an embodiment. The L-SIG 215, the HE-SIGAs 220 and the HE-SIGB 235 generally carry formatting information for the data unit 200, in an embodiment. The data unit 200 also includes a data portion 240.

According to an embodiment, each of the L-STFs 205 and each of the L-LTFs 210 have a format as specified in a legacy protocol such as the IEEE 802.11a Standard, the IEEE 802.11g Standard, the IEEE 802.11n Standard, and/or the IEEE 802.11ac Standard. In an embodiment, each of the L-SIGs 215 has a format at least substantially as specified in legacy protocol (e.g., the IEEE 802.11a Standard, the IEEE 802.11g Standard, the IEEE 802.11n Standard, and/or the IEEE 802.11ac Standard), In such embodiments, the length and rate subfields in the L-SIGs 215 is set to indicate the duration T corresponding to the remainder of the data unit 200 after the legacy portion. This permits client stations that are not configured according to the HEW protocol to determine an end of the data unit 200 for carrier sense multiple access/collision avoidance (CSMA/CA) purposes, for example. For example, the legacy client stations determine the duration of the remainder of the data unit 200 and refrain from accessing the medium (or at least transmitting in the medium) for the duration of the remainder of the data unit 200, in an embodiment. In other embodiments, each of the L-SIGs 215 has a format at least substantially as specified in legacy protocol (e.g., the IEEE 802.11a Standard, the IEEE 802.11g Standard, the IEEE 802.11n Standard, and/or the IEEE 802.11ac Standard) but with length field in the L-SIGs 225 set to indicate a duration of the time remaining in a transmission opportunity (TXOP) during which the data unit 200 is transmitted. In such embodiments, client stations that are not configured according to the HEW protocol determine an end of the TXOP and refrain from accessing the medium (or at least transmitting in the medium) for the duration of the TXOP. Thus, the medium is protected from transmissions by a legacy client station for the duration of the TXOP even if the legacy client station that does not support MU-MIMO and OFDMA communication and cannot decode, or determine duration of, data units that are transmitted subsequent to transmission of the data unit 200 using MU-MIMO or OFDMA transmissions, in an embodiment.

In an embodiment, the HE-preamble portion 204 at least substantially conforms to a legacy communication protocol, such as the IEEE 802.11ac Standard. In another embodiment, the HE-preamble portion 204 conforms to the first communication protocol but does not conform to any legacy communication protocol. For example, the HE-preamble portion 204 includes a higher number of OFDM symbols in one or more of the HE-SIGA field 220, the HE-STF field 225, each of the HE-LTF fields 230 and the HE-SIGB as compared to the corresponding fields defined by any legacy communication protocol.

In the embodiment of FIG. 2, the data unit 200 occupies a 20 MHz bandwidth and includes one of each of the L-STF 205, the L-LTF 210, the L-SIG 215, and the HE-SIGA (s) 220. In other embodiments in which an OFDM data unit similar to the data unit 200 occupies a cumulative bandwidth other than 20 MHz, each of the L-STF 205, the L-LTF 210, the L-SIG 215, the HE-SIGA (s) 220 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 205, the L-LTF 210, the L-SIG 215, and the HE-SIGA (s) 220. In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 3:
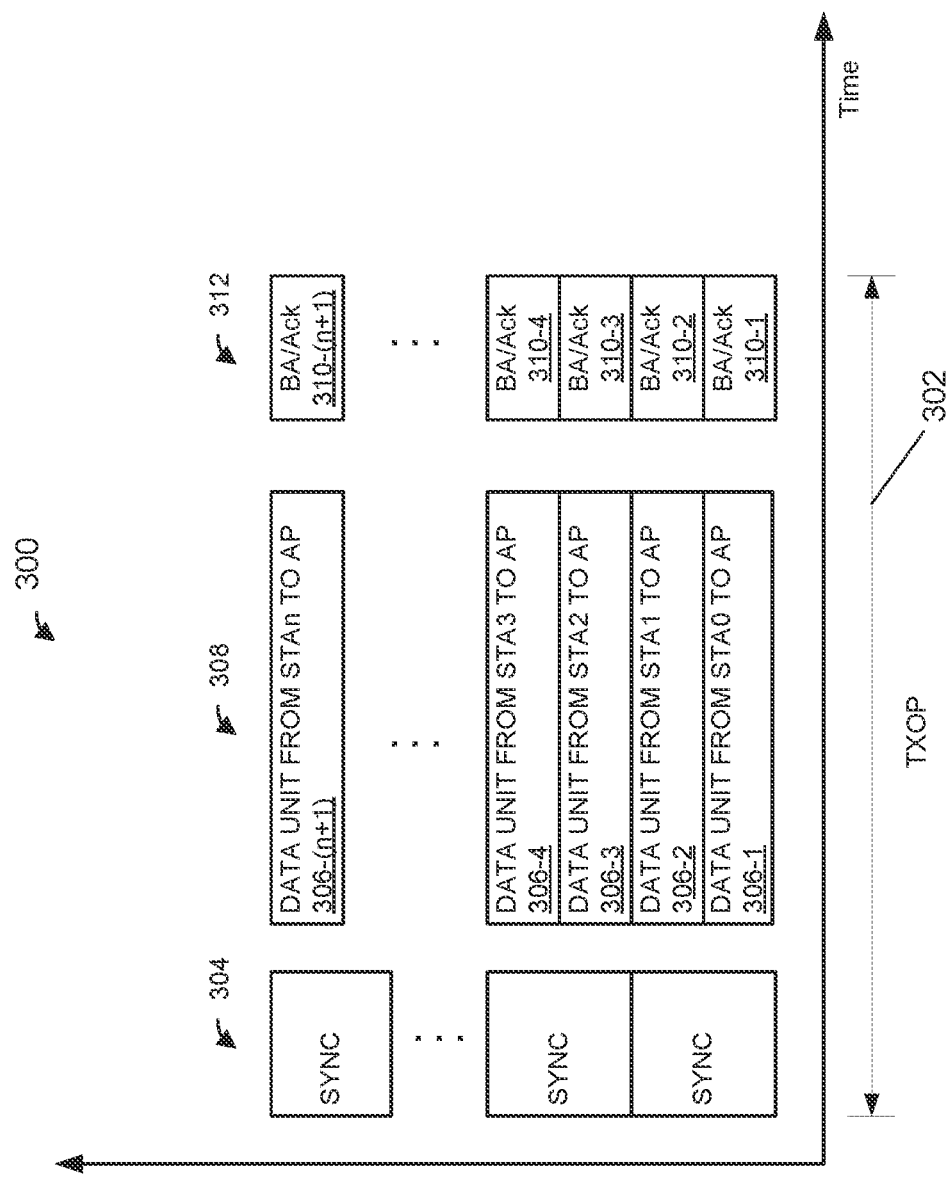
FIG. 3 is a diagram of an example transmission sequence in a WLAN, according to an embodiment.

FIG. 3 is a diagram of an example transmission sequence 300 in a WLAN, such as the WLAN 10 of FIG. 1, according to an embodiment, in which an AP, such as the AP 14, prompts multiple client stations, such as multiple ones of the client stations 25, to transmit independent data simultaneously to the AP during a transmission opportunity (TXOP) 302. The AP 14 generates and transmits a communication frame 304 that prompts the multiple client stations to transmit independent data simultaneously to the AP during the TXOP 302, in an embodiment. In an embodiment, the communication frame 304 is a management frame or a control frame, such as a synchronization (SYNC) frame. In an embodiment, the communication frame 304 prompts multiple client stations in an MU-MIMO group of client stations to simultaneously transmit independent data to the AP using respective spatial streams. In another embodiment, the communication frame 304 prompts multiple client stations in an OFDMA group of client stations to simultaneously transmit independent data to the AP using respective OFDM subchannels.

In an embodiment, the communication frame 304 occupies a bandwidth of a primary channel (e.g., a primary 20 MHz channel) of the WLAN 10. In an embodiment, the AP 14 transmits the communication frame 304 in the primary channel of the WLAN 10. In an embodiment, the AP 14 further duplicates the communication frame 304, and transmits a duplicated communication frame 304 in each channel (each 20 MHz channel) of the WLAN 10. The communication frame 304 indicates, to the multiple client stations 25, which spatial stream or streams, or which OFDM channel or channels, is/are allocated to each of the multiple client stations 25, in an embodiment. Addition ally or alternatively, the communication frame 304 indicates other transmission parameters to the multiple client stations 25, such as which modulation and coding scheme (MCS) each of the client stations should use, the OFDM numerology (e.g., guard interval, tone spacing, etc.) that each of the multiple client stations should use, transmit power that each of the multiple client stations 25 should use, etc. In an embodiment, the communication frame 304 is formatted according to the physical layer data unit (PPDU) format specified in the IEEE 802.11a Standard, the IEEE 802.11g Standard, IEEE 802.11n Standard and/or IEEE 802.11ac Standard. In an embodiment, the communication frame 304 corresponds to the data unit 200 of FIG. 2. In another embodiment, the communication frame 304 is a suitable data unit different from the data unit 200 of FIG. 2.

In response to receiving the communication frame 304, the multiple client stations transmit independent data simultaneously to the AP 14 during the TXOP 302. For example, the multiple client stations 25 transmit respectively data units 306 to the AP 14 as parts of a multi-user uplink transmission 308 to the AP 14, in an embodiment. Each data unit 306 includes a MAC protocol data unit (MPDU) from the corresponding client station 25 to the AP 14 or an aggregated MDPU (A-MPDU), that includes multiple MPDUs, from the corresponding client station 25 to the AP 14, in various embodiments. In an embodiment, the uplink transmission 308 is an MU-MIMO transmission from the client stations 25 to the AP 14. In this embodiment, the client stations 25 transmit the respective data units 306 using respective one or more spatial streams allocated to the client stations 25. In an other embodiment, the uplink transmission 308 is an OFDMA transmission from the client stations 25 to the AP 14. In this embodiment, the client stations 25 transmit the respective data units 306 using respective OFDM subchannels allocated to the client stations 25.

In response to receiving the uplink transmission 308 from the client stations 25, the AP 14 generates and transmits multiple acknowledgement data units 310 that include respective acknowledgment frames (Acks or BlockAcks (BAs)) to acknowledge data units 306 received from the client stations 25. In the embodiment shown in FIG. 3, the AP transmits separate independent acknowledgement data units 310 the multiple client station 25 as parts of a multi-user (MU) downlink acknowledgement data unit 312 to the client stations 25. In an embodiment, the downlink MU acknowledgement data unit 312 is an MU-MIMO data unit transmitted from the AP 14 to the multiple client stations 25. In this embodiment, the AP 14 transmits respective acknowledgement data units 310 to the client stations 25 using respective spatial streams allocated to the client stations 25. For example, in an embodiment, the AP 14 transmits the acknowledgement data units 310 to respective client stations 25 using the same spatial streams as the spatial streams in which the corresponding data units 306 were transmitted to the AP 14, in an embodiment. In an embodiment in which the downlink MU acknowledgement data unit 312 is an MU-MIMO transmission from the AP 14 to the multiple client stations 25, the AP 14 conducts a suitable beamforming training procedure (s) with the multiple client stations 25 prior to transmitting the downlink MU acknowledgement data unit 312, and, based on the beamforming training, beamforms transmission of the downlink MU acknowledgement data unit 312 to the multiple client stations 25.

In an other embodiment, the downlink MU acknowledgement data unit 312 is an OFDMA data unit transmitted from the AP 14 to the multiple client stations 25. In this embodiment, the AP 14 transmits respective acknowledgement data units 310 to the client stations 25 using respective OFDM subchannels allocated to the client stations 25. For example, in an embodiment, the AP 14 transmits the acknowledgement data units 310 to respective client stations 25 using the same OFDM subchannels as the OFDM subchannels in which the corresponding data units 306 were transmitted to the AP 14, in an embodiment. In another embodiment, the AP 14 transmits the acknowledgement frames 310 to respective client stations 25 using different OFDM subchannels as compared to at least some of the OFDM subchannels in which the corresponding data units 306 were transmitted to the AP 14. In some embodiments, the downlink MU acknowledgement data unit 312 is an OFDMA data unit transmitted from the AP 14 to the multiple client stations 25 even if the data units 306 were transmitted to the AP 14 as parts of an MU-MIMO transmission to the AP 14 (i.e., even if the uplink transmission 308 is an MU-MIMO transmission from the client stations 25 to the AP 14).

Although in the embodiment illustrated in FIG. 3 only one communication frame 304, only one uplink transmission 308 and only one MU acknowledgement data unit 312 are transmitted during the TXOP 302, multiple communication frames 304, multiple uplink transmissions 308 and/or multiple acknowledgement data units 312 are transmitted during the TXOP 302, in some embodiments. For example, in an embodiment, the communication frame 304 prompts the multiple client stations 25 to transmit multiple uplink data units during the TXOP 302. As another example, in an embodiment, an additional communication frame 304, transmitted during the TXOP 302, subsequent to transmission of the downlink acknowledgement data nit 312, prompts the multiple client stations 25 to simultaneously transmit additional uplink data units 306 to the AP 14, in some embodiments. Transmission of the additional uplink data units 306 is followed by transmission of additional downlink acknowledgement data units 310 to acknowledge the additional uplink data units 306, in an embodiment.

In some embodiments, the TXOP 302 includes transmission of one or more MU downlink transmissions, such as one or more downlink OFDMA transmissions or one or more downlink MU-MIMO transmissions, from the AP 14 to the client stations 25, in addition to the uplink transmission 308 from the multiple client stations 25 to the AP 14. For example the communication frame 304 indicates that a downlink transmission to the multiple client stations 25 will follow the uplink transmission received from the client stations 25, in an embodiment. Alternatively, an additional communication frame 304, transmitted during the TXOP 302, subsequent to transmission of the downlink acknowledgement data nit 312, indicates that an MU downlink transmission to the multiple client stations 25 will follow the additional communication frame 304, in some embodiments. In an embodiment, the MU downlink transmission to the multiple client stations 25 includes respective downlink data units having independent data transmitted to the multiple client stations 25.

In some embodiments, the acknowledge data units 310 are included in, or combined with, a multi-user (e.g., MU-MIMO of OFDMA) downlink data transmission from the AP 14 to the client stations 25 during the TXOP 302. For example, in an embodiment, the communication frame 304 indicates a downlink multi-user (e.g., OFDMA) transmission to the multiple client stations 25 during the TXOP 302, that will follow the uplink MU transmission triggered by the communication frame 304. Alternatively, after receiving the uplink transmission 308, the AP 14 transmits another communication frame such as the communication frame 304 to trigger a downlink multi-user (e.g., OFDMA) transmission to the multiple client stations 25 to take place during the TXOP 302, in an embodiment. The AP 14 then includes the acknowledge data units 310 in the downlink OFDMA transmission to the client stations 25, in such embodiments. That is, in such embodiments, the downlink multi-user transmission includes both (i) respective acknowledgement data units 310 that carry acknowledgement information to the client stations 25 and (ii) respective data units, such as respective A-MPDUs, that carry data for the client stations 25.

In an embodiment, the acknowledgement data units 310 are not necessary of equal length. For example, in an embodiment, each of the acknowledgement data units 310 includes one of (i) an acknowledgement (Ack) frame that acknowledges a data unit 306 that included a single data unit, such as a single MPDU or (ii) a block acknowledgement (BlockAck or BA) frame that acknowledges a data unit 306 that included multiple data units, such as multiple aggregated MPDUs. An acknowledgement frame 306 that include an Ack frame is shorter than an acknowledgement data unit 310 that includes a BlockAck frame, in an embodiment. Additionally or alternatively, in some embodiments, the AP 14 transmits at least some of the acknowledgement data units 310 using different bandwidths, different data rates and/or different modulation and coding schemes as compared to other ones of the acknowledgement data units 310. Different bandwidths, data rates and/or modulation and coding schemes of the acknowledgement data units 310 results in different lengths or time durations of the acknowledgement data units 310, in an embodiment. In an embodiment, the AP 14 pads one or more of the acknowledgement data units 310, using a suitable padding technique, to equalize the lengths of the acknowledgement data units 310. As merely an example, AP 14 pads one or more of the acknowledgement data units 310 using MAC and/or PHY padding techniques specified in the IEEE 802.11ac Standard, in an embodiment.

In an embodiment, the AP 14 selects different data rates and/or modulation and coding schemes to be used for transmission of different acknowledgement data units 310, in an embodiment. In an embodiment, the AP selects a suitable data rate and/or modulation and coding scheme for each of the acknowledgment data units 310 based on capabilities of the client station 25 that is the intended recipient of the acknowledgement data units 310. For example, the AP 14 selects, for each of the acknowledgement data units 310, a suitable modulation and coding scheme supported by the client station 25 that is the intended recipient of the acknowledgement data units 310 as long as the resulting time duration of transmission of the acknowledgement data units 310 does not exceed the maximum time duration allotted for the transmission of the MU data unit 312, in an embodiment.

In an embodiment, the AP 14 transmits a suitable data unit in place of one or more of the acknowledgement data units 310 in case the AP 14 did not receive corresponding one or more data units 306 in the uplink transmission 308. For example, the AP 14 does not receive a data unit 306 from a client station 25 that was prompted by the communication frame 304, in some scenarios. The AP 14 then transmits a data unit, such as a quality of service (QoS) Null frame, an MPDU delimiter, or another suitable frame, in place of the corresponding acknowledgement data units 310 to the client station 25, in an embodiment.

Figure 4:
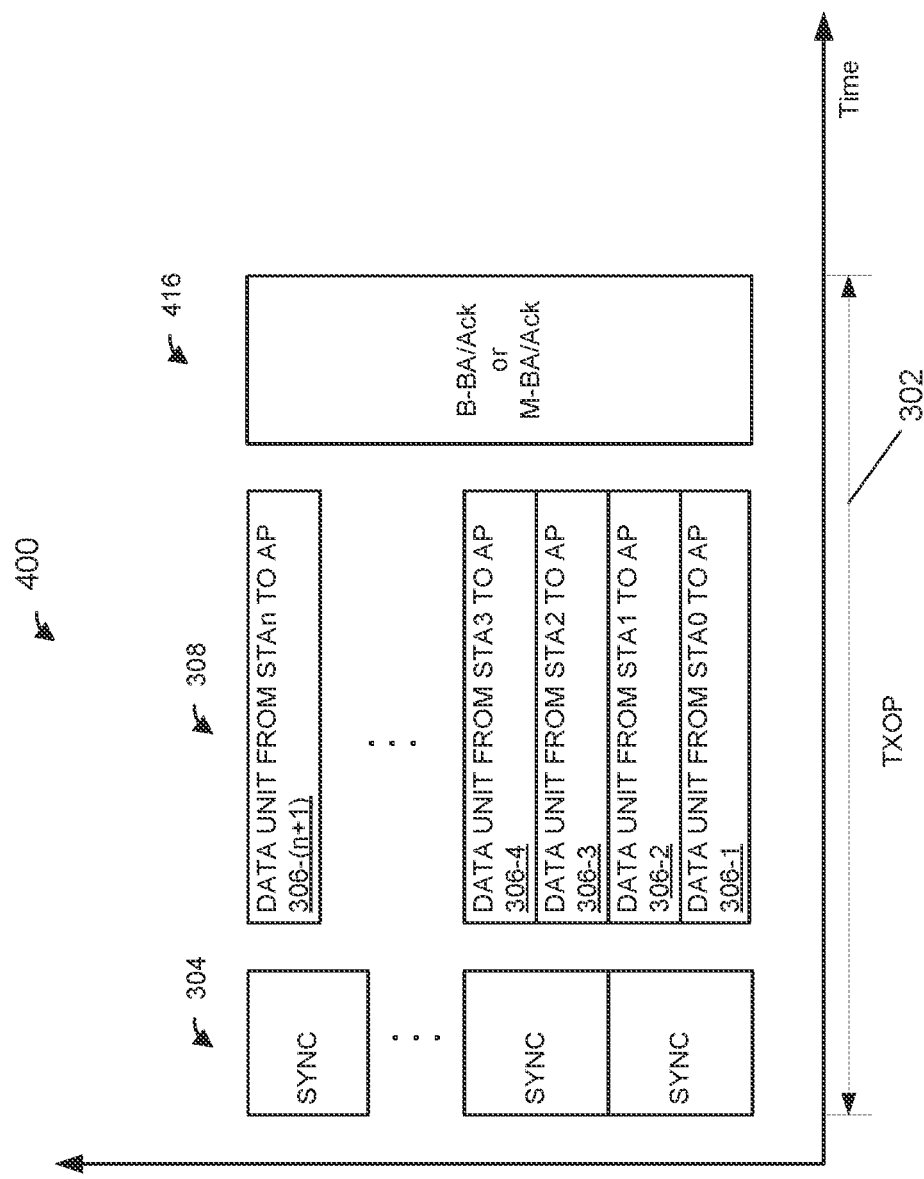
FIG. 4 is a diagram of an other example transmission sequence in a WLAN, according to another embodiment.

FIG. 4 is a diagram of another example transmission sequence 400 in a WLAN, such as the WLAN 10 of FIG. 1, according to an embodiment. The transmission sequence 400 is generally the same as the transmission sequence 300 of FIG. 3, however the AP 14 transmits a single acknowledgement data unit 416 that includes a broadcast or a multicast acknowledgement data unit 416 transmitted to multiple client stations 25 instead of multiple acknowledgement data units 310 that include separate acknowledgment frames transmitted to each of the multiple client stations 25. In an embodiment, the acknowledgement data unit 416 includes a broadcast or a multicast acknowledgement frame that the AP 14 transmits to the client stations 25 from which the data units 306 were received. In an embodiment, the acknowledgement data unit 416 includes a broadcast MAC address. In an embodiment, the acknowledgement data unit 416 includes the group ID of the client uplink group (e.g., as a receiver address), station identifiers (e.g., association identifiers (AIDs) or partial AIDs) from which the data units 306 were transmitted, and/or other suitable acknowledgement information which acknowledges the transmissions from the multiple client stations 25. In an embodiment, the acknowledgement data unit 416 corresponds to the data unit 200 of FIG. 2. In another embodiment, the acknowledgement data unit 416 is a suitable data unit different from the data unit 200 of FIG. 2.

In an embodiment, the acknowledgement data unit 416 includes Ack information and BlockAck (BA) information to acknowledge MPDU or A-MPDU transmissions, respectively, from respective ones of the client stations 25. In an embodiment, the AP 14 transmits the acknowledgement data unit 416 in a single OFDM channel and/or in a single spatial stream. For example, in an embodiment, the AP 14 transmits the acknowledgement data unit 416 in the OFDM channel in which the uplink transmission 308 was transmitted to the AP 14. In this embodiment, the acknowledgement data unit 416 occupies the bandwidth that was cumulatively occupied by the data units 306 being acknowledged by the AP 14 (e.g., bandwidth of the transmission 308 to the AP 14), In an embodiment in which the acknowledgement data unit 416 occupies the bandwidth that was cumulatively occupied by the data units 306 being acknowledged by the AP 14, the acknowledgement data unit 416 may be shorter (e.g., in transmission time) for example compared to a system in which the acknowledgement data unit 416 occupies the bandwidth of a primary channel of the WLAN 10. In an other embodiment, the AP 14 duplicates the acknowledgement data unit 416 in each OFDM channel, such as each 20 MHz channel within the bandwidth that was cumulatively occupied by the data units 306 being acknowledged by the AP 14. In such embodiments, the client stations 25 receiving the acknowledgement data unit 416 can combine the duplicated acknowledgement data units 416, for example to improve reception performance. In an embodiment, the acknowledgement data unit 416 is a physical layer protocol data unit (PPDU) formatted according to a legacy PPDU format, such as a PPDU format specified in the IEEE 802.11a Standard or an IEEE 802.11g Standard. In this embodiment, a legacy client station, such as the client station 25-4, can decode the acknowledgement data unit 416, and can obtain a duration of the acknowledgement data unit 416 from duration information included in a MAC header within the acknowledgement data unit 416. In another embodiment, the acknowledgement data unit 416 is a physical layer protocol data unit (PPDU) formatted according to a new format defined in the first communication protocol (e.g., a high efficiency (HE) PPDU format). The new PPDU format is used to transmit the acknowledgement data unit 416, for example, in outdoor or extended range communication channel in which the VHT format may result in an insufficient reception quality, in some embodiments. In some embodiments, the acknowledgement data unit 416 is combined with other transmission, such as an aggregate media access control protocol data unit (A-MPDU) or a SYNC communication frame subsequently transmitted to the client stations 25, during the TXOP 302.

In an embodiment, the AP 14 selects, from a set of available data rates and/or modulation and coding schemes (MCSs), a data rate and/or a modulation and coding scheme (MCS) to be used for transmission of the acknowledgement data unit 416. In an embodiment, the AP 14 selects the data rate and/or the coding scheme from a basic rate set of a basic service set (BSSBasicRateSet) of a BSS served by the AP 14. In an embodiment, the AP 14 selects any suitable data rates and/or any suitable MCS from the set of available data rate and/or MCSs, such as from the BSSBasicRateSet. Alternatively, in an embodiment, the AP 14 selects any suitable data rates and/or any suitable MCS from a set of available data rate and/or MCSs from a mandatory rate set supported by the PHY processing unit 20 of the AP 14. For example, the AP 14 selects any suitable data rates and/or any suitable MCS from a set of available data rate and/or MCSs from a mandatory rate set supported by the PHY processing unit 20 of the AP 14 when the BSSBasicRateSet is empty or idle, in an embodiment.

In at least some embodiments and/or scenarios, the AP 14 selects a data rate, an MCS, and/or Nss for transmission of the acknowledgement data unit 416 without considering the data rates and/or modulation and coding schemes with the data units 306 were transmitted to the AP 14. In at least some embodiments and/or scenarios, the AP 14 selects a data rate that is greater than the lowest data rate or MCSs among the data rates or MCSs of the data units 306. In another embodiment, the AP 14 considers the data rates and/or modulation and coding schemes, with the data units 306 were transmitted to the AP 14, when determining a data rate and/or an MCS for transmission of the acknowledgement data unit 416. For example, the AP 14 selects a highest available data rate and/or MCS that is less than or equal to the lowest data rate and/or MCSs among the data rates and/or MCSs of the data units 306.

In an embodiment, the AP 14 selects a data rate, a modulation and coding scheme (MCS), and/or a number of spatial streams (Nss) for transmission of the acknowledgement data unit 416 from a set of data rates and/or modulation and coding schemes that are supported by the client stations 25 to which the acknowledgement data unit 416 is directed. As an example, in an embodiment in which the acknowledgement data unit 416 is a non-HT data unit, such as a data unit that conforms to the IEEE 802.11a Standard, the AP 14 selects, for transmission of the acknowledgement data unit 416, a data rate from a set of data rates supported by the client stations 25 that are the intended recipients of the acknowledgement data unit 416. As another example, in an embodiment in which the acknowledgement data unit 416 is an HT data unit, such as a data unit that conforms to the IEEE 802.11n Standard, the AP 14 selects, for transmission of the acknowledgement data unit 416, an MCS from a set of MCSs supported by the client stations 25 that are the intended recipients of the acknowledgement data unit 416. As another example, in an embodiment in which the acknowledgement data unit 416 is a VHT data unit, such as a data unit that conforms to the IEEE 802.11ac Standard, the AP 14 selects, for transmission of the acknowledgement data unit 416, an MCS and Nss from a set of MCSs/Nss supported by the client stations 25 that are the intended recipients of the of the acknowledgement data unit 416. As yet another example, in an embodiment in which the acknowledgement data unit 416 is an HE data unit, such as a data unit that conforms to the IEEE 802.11ax Standard, the AP 14 selects, for transmission of the acknowledgement data unit 416, an MCS and Nss from a set of MCSs/Nss supported by the client stations 25 that are the intended recipients of the of the acknowledgement data unit 416. In at least some such embodiments, the AP 14 selects, for transmission of the acknowledgement data unit 416, a data rate, and MCS and/or Nss that is/are higher than the corresponding parameters used for transmission of the data units 306 being acknowledged by the acknowledgement data unit 416. In such embodiments, transmission time of the acknowledgement data unit 416 may be reduced compared to systems in which selection of data rate, and MCS and/or Nss is limited by the data rate, MCS and/or Nss used for transmission of the data units 306.

In some embodiments, other client stations 25 in the WLAN 10 may be unable to decode the entire acknowledgement data unit 416 if such other client stations 25 do not support the data rate, MCS and/or Nss selected for transmission of the acknowledgement data unit 416. Accordingly, a client station 25 that cannot decode the entire acknowledgement data unit 416 is unable to set its navigation allocation vector (NAV) based on a duration indicated within a header (e.g., MAC header) included in the acknowledgement data unit 416. However, in an embodiment in which the acknowledgement data unit 416 is an HE data unit, a non-legacy client station 25 that supports the HE communication protocol ("HE client station") is able to set its NAV based on a duration indication included in a signal field of a preamble of the acknowledgement data unit 416 even if the non-legacy client station does not support the data rate, MCS and/or Nss selected for transmission of the acknowledgement data unit 416, in an embodiment.

Referring to FIG. 2, in an embodiment, the HE-SIGA field 220 or the HE-SIGB field 235 included in the acknowledgement data unit 416 includes a duration indication that indicates a remaining duration of the TXOP 302 after transmission of the acknowledgement data unit 416, in an embodiment. In an embodiment, an HE client stations 25 that is that is not a participant in the TXOP 302, such as an HE client station 25 that is not a member of an MU-MIMO group or an OFDMA group indicated by the communication frame 304, sets its NAV based on a duration indication in the HE-SIGA field 220 or the HE-SIGB field 235 included in the acknowledgement data unit 416. A legacy station 25, however, is generally not able to decode the duration indication in the HE-SIGA field 220 or the HE-SIGB field 235 included in the acknowledgement data unit 416. In an embodiment, the communication frame 304 that triggers transmission of the data units 306 is decodable by legacy client stations, and includes a duration indications (e.g., in the HE-SIGA field 220 or the HE-SIGB field 235 included in the communication frame 304) that indicates a remaining duration of the TXOP 302 after transmission of the communication frame 304, in an embodiment. A legacy client station 25 sets its NAV based on the duration indication in the communication frame 304, in an embodiment Accordingly, transmission of the acknowledgement data unit 416 is protected from transmissions by client stations 25 that are not intended participants in the TXOP 302 even if such client stations 25 are unable to decode the acknowledgement data unit 416, in an embodiment.

In an embodiment, if a client station 25 detects an error in reception of the acknowledgement data unit 416, then the client station 25 cannot its NAV and instead sets its backoff timer to a duration of an extended interframe space (EIFS), and, accordingly, refrains from accessing the medium for the duration of EIFS. If the acknowledgement data unit 416 is the not the last frame in transmitted in the TXOP 302, then the backoff timer, set to the duration of EIFS based on detection of an error in the acknowledgement frame 402, will count down to zero before the end of the TXOP 302, in an embodiment. On other hand, if the acknowledgement data unit 416 is the last frame in transmitted in the TXOP 302, then the backoff timer, set to the duration of EIFS based on detection of an error in the acknowledgement frame 402, will not count down to zero before the end of the TXOP 302, thereby preventing the client station that received the acknowledgement data unit 416 in error from accessing the medium after the end of the TXOP 302, in an embodiment. In an embodiment, to allow each client station 25 that is not an intended recipient of the acknowledgement data unit 416 to appropriately set its NAV, the AP 14 selects, for transmission of the acknowledgement data unit 416, a data rate, an MCS, and/or a Nss supported by all client stations 25 in the WLAN 10. In an embodiment, to allow each client station 25 that is not an intended recipient of the acknowledgement data unit 416 to appropriately set its NAV, the AP 14 selects, for transmission of the acknowledgement data unit 416, a data rate, an MCS, and/or a Nss supported by all client stations 25 in the WLAN 10 if the acknowledgement data unit 416 is the last frame of the TXOP 302.

As an example, in an embodiment in which the acknowledgement data unit 416 is a non-HT data unit, such as a data unit that conforms to the IEEE 802.11a Standard, if the acknowledgement data unit 416 is not the last frame to be transmitted in the TXOP 302, then the AP 14 selects, for transmission of the acknowledgement data unit 416, a data rate from a set of data rates supported by the client stations 25 that are the intended recipients of the of the acknowledgement data unit 416. On the other hand, continuing with the same example, if the acknowledgement data unit 416 is the last frame to be transmitted in the TXOP 302, the AP 14 selects, for transmission of the acknowledgement data unit 416, a data rate from a basic rate set of a basic service set (BSSBasicRateSet) of a BSS served by the AP 14, or, when the BSSBasicRateSet is empty or idle, selects a data rate from a setoff mandatory data rates supported by the PHY processing unit 20 of the AP 14, in an embodiment. Accordingly, if the acknowledgement data unit 416 is the last frame transmitted in the TXOP 302, then all client stations 25 in the BSS are able to decode the acknowledgement data unit 416 for the purpose or setting NAV based on a duration indication included in the acknowledgement data unit 416, in this embodiment.

As another example, in an embodiment in which the acknowledgement data unit 416 is an HT data unit, such as a data unit that conforms to the IEEE 802.11n Standard, if the acknowledgement data unit 416 is not the last frame to be transmitted in the TXOP 302, then the AP 14 selects, for transmission of the acknowledgement data unit 416, an MCS from a set of MCSs supported by the client stations 25 that are the intended recipients of the of the acknowledgement data unit 416. On the other hand, continuing with the same example, if the acknowledgement data unit 416 is the last frame to be transmitted in the TXOP 302, the AP 14 selects, for transmission of the acknowledgement data unit 416, an MCS from a basic MCS set of a basic service set (BSSBasicMCSSet) of a BSS served by the AP 14, or, when the BSSBasicMCSSet is empty or idle, selects an MCS from a set of mandatory MCSs supported by the PHY processing unit 20 of the AP 14, in an embodiment. Accordingly, if the acknowledgement data unit 416 is the last frame transmitted in the TXOP 302, then all client stations 25 in the BSS are able to decode the acknowledgement data unit 416 for the purpose or setting NAV based on a duration indication included in the acknowledgement data unit 416, in this embodiment.

As yet another example, in an embodiment in which the acknowledgement data unit 416 is a VHT data unit, such as a data unit that conforms to the IEEE 802.11ac Standard, the AP 14 selects, for transmission of the acknowledgement data unit 416, an MCS and Nss from a set of MCSs and numbers of spatial streams supported by the client stations 25 that are the intended recipients of the of the acknowledgement data unit 416. On the other hand, continuing with the same example, if the acknowledgement data unit 416 is the last frame to be transmitted in the TXOP 302, the AP 14 selects, for transmission of the acknowledgement data unit 416, an MCS and an Nss from a basic set of VHT-MCS and Nss supported by a BSS served by the AP 14, or, when the basic set of VHT-MCS and Nss is empty or idle, selects an MCS and Nss from a mandatory set of MCS and Nss supported by the PHY processing unit 20 of the AP 14, in an embodiment. Accordingly, if the acknowledgement data unit 416 is the last frame transmitted in the TXOP 302, then all client stations 25 in the BSS are able to decode the acknowledgement data unit 416 for the purpose or setting NAV based on a duration indication included in the acknowledgement data unit 416, in this embodiment.

In an embodiment in which the acknowledgement data unit 416 is an HE data unit, such as a data unit that conforms to the IEEE 802.11ax Standard, the AP 14 selects, for transmission of the acknowledgement data unit 416, an MCS and Nss from a set of MCSs and numbers of spatial streams supported by the client stations 25 that are the intended recipients of the of the acknowledgement data unit 416.

In some embodiments, the acknowledge data unit 416 is included in, or combined with, a multi-user (e.g., MU-MIMO of OFDMA) downlink data transmission from the AP 14 to the client stations 25 during the TXOP 302 or during another TXOP subsequent to the TXOP 302. That is, in such embodiments, the downlink multi-user transmission includes both (i) the acknowledgement data unit 416 intended for the client stations 25 and (ii) respective data units, such as respective A-MPDUs, intended for the client stations 25.

Figure 5:
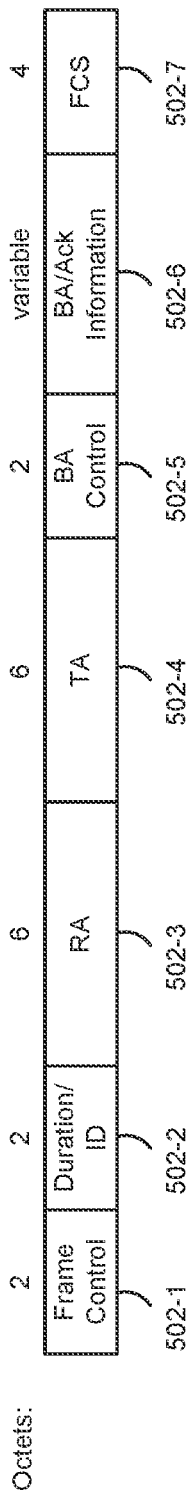
FIG. 5 is a diagram of an example an example acknowledgement frame, according to an embodiment.

FIG. 5 is a diagram of an example control field 500 included in an acknowledgement data unit transmitted by the AP 14 to one or more client stations 25. In an embodiment and/or scenario, the control field 500 is included in an acknowledgment data unit transmitted by the AP 14 to a single client station 25 to acknowledge an uplink data unit received by the AP from the single client station 25. In another embodiment and/or scenario, the control field 500 is included in an acknowledgment data unit transmitted by the AP 14 to multiple client station 25 to acknowledge uplink data units simultaneously transmitted by the multiple client stations 25 to the AP 14. In an embodiment and/or scenario, the control field 500 is included in each acknowledgement data unit 310 of FIG. 3. In another embodiment and/or scenario, the control field 500 is included in the acknowledgement data unit 416 of FIG. 4. In another embodiment and/or scenario, the control field 500 is included in a suitable acknowledgement frame different from the acknowledgement data units 310 or the acknowledgement data unit 416.

The control element 500 includes a plurality of fields 502. In the embodiment illustrated in FIG. 5, the fields 502 include a frame control field 502-1, a duration/id field 502-2, a receiver address (RA) field 502-3, a transmitter address (TA) field 502-4, a BA control field 502-5, a BA/Ack information field 502-6, and a frame sequence check (FCS) field 502-7. The number indicated in FIG. 5 above each of the fields 502 indicates the number of octets of bits in the corresponding field 502, according to an example embodiment.

The RA field 502-3 includes an address of an intended receiver of the acknowledgement data unit that includes the control field 500, in an embodiment. In an embodiment and/or scenario in which the control field 500 is included in a unicast acknowledgement data unit directed to only one client station 25, the RA field 502-3 includes a unicast address, such as a unicast MAC address, corresponding to the one client station 25. On the other hand, in an embodiment and/or scenario in which the control field 500 is included in a broadcast acknowledgement data unit directed to multiple client stations 25, the RA field 502-3 includes a broadcast address, such as a broadcast MAC address, to indicate that the acknowledgement data unit is directed to multiple client stations 25.

Figure 6:
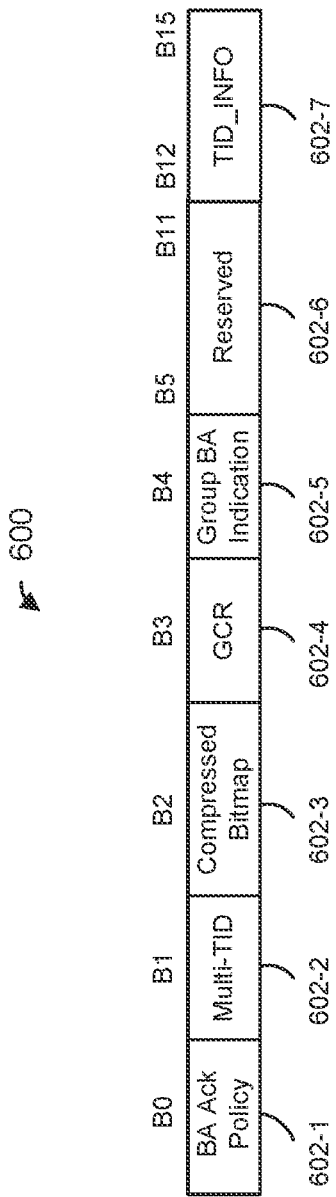
FIG. 6 is a diagram of an example control field of an acknowledgement frame, according to an embodiment.

FIG. 6 is a diagram illustrating bit allocation of a BA control field 600 included in an acknowledgement data unit, according to an embodiment. The BA control field 600 corresponds to the BA control field 502-5, in an embodiment. The BA control field 600 includes a plurality of subfields 602. The subfields 602 collectively comprise 16 bits, in the illustrated embodiment. The subfields 602 collectively comprise a suitable number of bits different than 16 bits, in other embodiments. In the embodiment illustrated in FIG. 6, the BA control field 600 includes a BA Ack policy subfield 602-1, a multi-TID subfield 602-2, a compressed bitmap subfield 602-3, a GroupCast with Retries (GCR) subfield 602-4, a group BA indication subfield 60205 a reserved subfield 602-6 and a TID information subfield 602-7. Bit allocation for each of the subfields 602, according to an example embodiment, is illustrated in FIG. 6 above the corresponding subfields 602.

In an embodiment, the group BA indication field 602-5 indicates whether the acknowledgement data unit that includes the BA control field 600 includes a single acknowledgement to acknowledge a single data unit received from one client station 25 or includes multiple acknowledgements to acknowledge multiple data units received from multiple client stations 25, for example as parts of an MU-MIMO uplink transmission from the multiple client stations 25 or an OFDMA transmission from the multiple client stations 25. In an embodiment, the group BA indication field 602-5 serves as an additional indication to indicate whether the acknowledgement data unit that includes the BA control field 600 includes a single acknowledgement directed to one client station 25 or multiple acknowledgements directed to multiple client stations 25, in addition to the indication provided by the RA field 502-3 as discussed above with respect to FIG. 5. In another embodiment, the group BA indication subfield 602-5 is omitted from the BA control field 600, and the RA field 502-3 is instead relied upon to indicate to indicate whether the acknowledgement data unit that includes the BA control field 600 includes a single acknowledgement directed to one client station 25 or multiple acknowledgements directed to multiple client stations 25.

Figure 7:
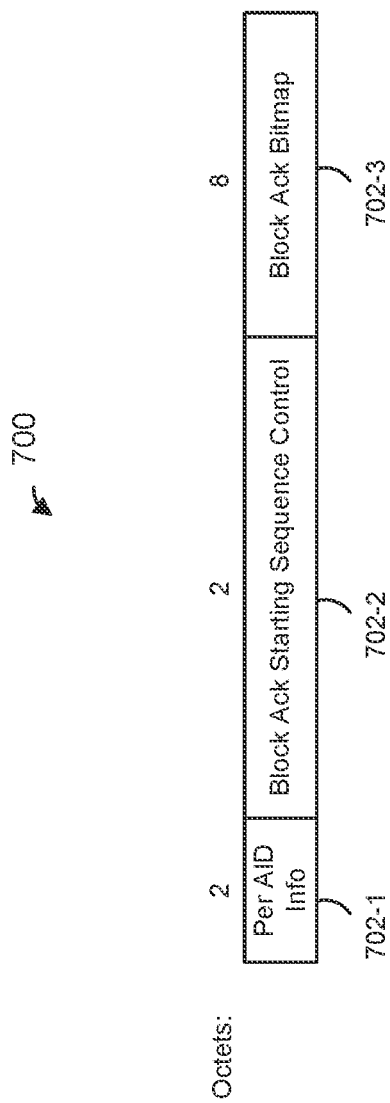
FIG. 7 is a diagram of an information element included in an acknowledgement frame, according to an embodiment.

FIG. 7 is a diagram of an example per-AID information element 700 included in an acknowledgement data unit, according to an embodiment. In an embodiment, one or more per-AID information elements 700 is/are included in the BA/Ack information field 502-6 of FIG. 5. For example, the BA/Ack information field 502-6 includes a per-AID information element 700 corresponding to each client station 25 from which a data unit 306 was received by the AP 14 in the uplink transmission 308 (FIG. 3), in an embodiment. Accordingly, if the BA/Ack information field 502-6 excludes a per-AID information element 700 corresponding to a particular client station 25 that transmitted a data unit 306 as part of the uplink transmission 308, this indicates that the data unit 306 from the particular client station was not received by the AP 14, in an embodiment.

With continued reference to FIG. 7, the per-AID information element 700 includes fields 702, in an embodiment. The number indicated in FIG. 7 above each of the fields 702 indicates the number of octets of bits in the corresponding field 702, according to an example embodiment. In an embodiment, the per-AID information element 700 includes at least a per-AID information field 702-1. Several example embodiments of the per-AID information field 702-1 are described with respect to FIGS. 8A-8B. Further, if the per-AID information element 700 includes a block acknowledgement corresponding to multiple data units received from a client station, then the per-AID information element 700 additionally includes a Block Ack starting sequence control field 702-2 and a Block Ack bitmap field 702-3, in an embodiment. On the other hand, if the per-AID information element 700 includes an acknowledgement that acknowledges a single data unit received from a client station, them the per-AID information element 700 omits the BlockAck starting sequence control field 702-2 and the BlockAck bitmap field 702-3, in an embodiment.

Figure 8A:
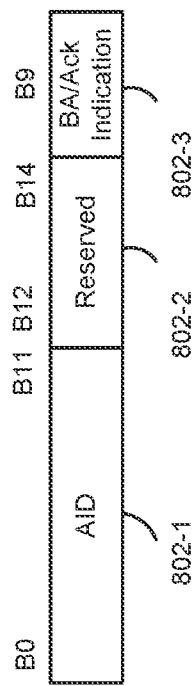
FIG. 8A is a diagram of an example subfield of an information field of an acknowledgement frame, according to an embodiment.

FIG. 8A is a diagram of an example per-AID information field 800, according to an embodiment. In an embodiment, the per-AID information field 800 corresponds to the per-AID information field 702-1. The per-AID information field 800 is included in a per-AID information element that acknowledges a single data unit from a particular client station 25, or multiple data units, associated with a same traffic identifier (TID), from a particular client station 25. The per-AID information field 800 includes an identifier subfield 802-1, a reserved subfield 802-2, and a BA/Ack subfield 802-3. The identified subfield 802-1 identifies a client station for which the per-AID information field 800 is intended, in an embodiment. In an embodiment, the identified subfield 802-1 includes at least a partial association identifier (AID) associated with the client station for which the per-AID information field 800 is intended. In another embodiment, the identified subfield 802-1 includes another suitable identifier of the client station for which the per-AID information field 800 is intended.

The BA/Ack indication field 802-3 indicates whether the per-AID information element that includes the per-AID information field 800 (e.g., the per-AID information element 700) includes (i) an acknowledgement that acknowledges a single data unit received from the client station identified by the identifier field 802-1 or (ii) a block acknowledgement that acknowledges multiple data units received from the client station identified by the identifier field 802-1. In an embodiment, the BA/Ack indication field 802-3 comprises one bit. In an embodiment, a value of a logic zero (0) of the BA/Ack indication field 802-3 indicates that the per-AID information element that includes the per-AID information field 800 (e.g., the per-AID information element 700) includes an acknowledgement that acknowledges a single data unit received from the client station identified by the identifier field 802-1, and a value of a logic one (1) of the BA/Ack indication field 802-3 indicates that the per-AID information element that includes the per-AID information field 800 (e.g., the per-AID information element 700) includes a block acknowledgement that acknowledges multiple data units received from the client station identified by the identifier field 802-1. In another embodiment, a value of a logic one (1) of the BA/Ack indication field 802-3 indicates that the per-AID information element that includes the per-AID information field 800 (e.g., the per-AID information element 700) includes an acknowledgement that acknowledges a single data unit received from the client station identified by the identifier field 802-1, and a value of a logic zero (0) of the BA/Ack indication field 802-3 indicates that the per-AID information element that includes the per-AID information field 800 (e.g., the per-AID information element 700) includes a block acknowledgement that acknowledges multiple data units received from the client station identified by the identifier field 802-1.

Figure 8B:
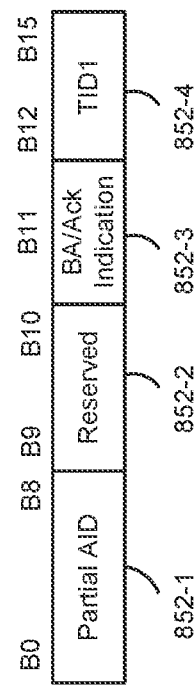
FIG. 8B is a diagram of an other example subfield of an information field of an acknowledgement frame, according to another embodiment.

FIG. 8B is a diagram of an example per-AID information field 850, according to another embodiment. In an embodiment, the per-AID information field 850 corresponds to the per-AID information field 702-1. The per-AID information field 850 is included in a per-AID information element that acknowledges multiple data units, associated with multiple traffic identifiers (TIDs), from a particular client station 25. In an embodiment, the per-AID information field 850 includes multiple per-TID information fields, each per-TID information field corresponding to a respective TID for which an acknowledgement is being provided. In an embodiment, each of the multiple information fields includes an identifier subfield 852-1, a reserved subfield 852-2, and a BA/Ack subfield 852-3, and a TID subfield 852-4. The identified subfield 852-1 identifies a client station for which the per-AID information field 800 is intended, in an embodiment. In an embodiment, the identified subfield 852-1 includes at least a partial association identifier (AID) associated with the client station for which the per-AID information field 850 is intended. In an embodiment, the identifier field 852-1 comprises fewer bits as compared to the number of bits in the identifier field 802-1 of FIG. 8A. For example, whereas the identifier field 802-1 of FIG. 8A comprises 12 bits, the identifier field 852-1 comprises 9 bits, in an embodiment. In an embodiment in which the identifier field 852-1 includes a partial AID associated with a client station for which the per-AID information field 800 is intended, the identifier field 852-1 includes 9 bits (e.g., 9 most significant bits, 9 least significant bits, or another suitable set of 9 bits) of the AID associated with the client station. In another embodiment, the identifier field 852-2 is expanded to include bits one or bits of there served subfield 852-2. For example, there served subfield 852-2 is omitted from the per-AID information field 850, and the identifier field 852-1 is expanded to comprise 11 bits, in an embodiment.

The BA/Ack indication subfield 852-3 indicates whether the per-AID information element that includes the per-AID information field 850 (e.g., the per-AID information element 700 of FIG. 7) includes (i) an acknowledgement that acknowledges a single data unit associated with the indicated TID in the TID subfield 852-4, or a block acknowledgement that acknowledges multiple data units associated with the indicated TID in the TID subfield 852-4, in an embodiment. The BA/Ack indication subfield 852-3 is generally the same as the BA/Ack indication subfield 802-3 of FIG. 8A, in an embodiment.

Referring back to FIG. 7, in an embodiment in which the BA/Ack indication 802-3 or the BA/Ack indication 852-3 indicates the per-AID information element 700 includes a block acknowledgment that acknowledges multiple data units, the Block Ack starting sequence control field 702-2 indicates a sequence number corresponding to the first one of the data units being acknowledged, and each bit of the Block Ack bitmap field 702-3 acknowledges a data unit with a sequence number that equals the sequence number indicated by the Block Ack starting sequence control field 702-2 plus the index of the bit. Thus, for example, the first bit (bit index 0) of the Ack bitmap field 702-3 acknowledges the data unit with the sequence number indicated by the Block Ack starting sequence control field 702-2, the second bit (bit index 1) Ack bitmap field 702-3 acknowledges the data unit with a sequence number indicated by the Block Ack starting sequence control field 702-2 plus 1, etc., in an embodiment. In an embodiment, the value of each bit of Ack bitmap field 702-3 indicates whether the corresponding data unit was successfully received by the AP 14. For example, a value of logic one (1) of a bit of Ack bitmap field 702-3 indicates that the corresponding data unit was successfully received by the AP 14, and a value of logic zero (0) of a bit of Ack bitmap field 702-3 indicates that the corresponding data unit was not successfully received (e.g., not received or received with an error) by the AP 14.

FIG. 9 is a flow diagram of an example method 900 for simultaneously communicating with multiple client devices in a WLAN, according to an embodiment. In an embodiment, the method 900 is implemented by an AP in the WLAN, according to an embodiment. With reference to FIG. 1, the method 900 is implemented by the AP 14. For example, the method 900 is implemented by the MAC processing unit 18 and/or by the PHY processing unit 20 of the AP 14, in an embodiment. In other embodiments, the method 900 is implemented by other components of the AP 14, or is implemented by a suitable communication device other than the AP 14.

At block 902, multiple uplink data units simultaneously transmitted by multiple client stations are received. In an embodiment, multiple data units 206 of FIGS. 2 and 3 are received. In an other embodiment, suitable data units different from the data units 206 of FIGS. 2 and 3 are received. In an embodiment, the multiple client stations are members of an MU-MIMO group, and the multiple data units are transmitted by the multiple client stations in respective spatial streams allocated to the client stations. In another embodiment, the multiple client stations are members of an OFDMA group, and the multiple data units are transmitted by the multiple client stations in OFDM channels allocated to the multiple client stations.

At block 904, an acknowledgment data unit is generated. In an embodiment, the acknowledgement data unit acknowledges receipt of the multiple data units received at block 902. In an embodiment, the acknowledgement data unit includes (i) an indication that indicates that the acknowledgement data unit is intended for multiple client stations and (ii) respective acknowledgement information for the multiple client stations. In an embodiment, the acknowledgement data unit includes a control field such as the control field 500 of FIG. 5. In an embodiment, the control field included in the acknowledgement data unit includes the BA control field 600 of FIG. 6 and the BA/Ack information element 700 of FIG. 7. In another embodiment, the acknowledgement data unit includes other suitable control fields and/or other suitable information elements that acknowledge receipt of the multiple data unit received at block 902.

At block 906, the acknowledgement data unit generated at block 904 is transmitted to the multiple client stations from which the uplink data units were received at block 902.

Figure 10:
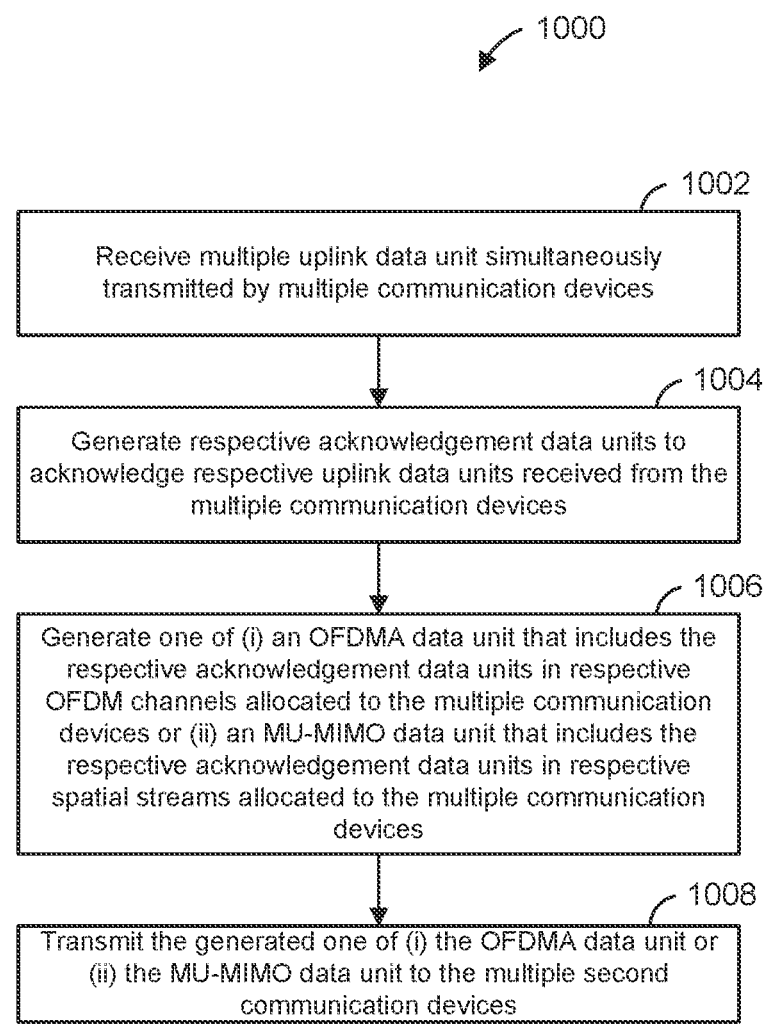
FIG. 10 is a flow diagram of an example method that is implemented by an AP in a WLAN, according to another embodiment.

FIG. 10 is a flow diagram of an example method 1000 for simultaneously communicating with multiple client devices in a WLAN, according to an embodiment. In an embodiment, the method 1000 is implemented by an AP in the WLAN, according to an embodiment. With reference to FIG. 1, the method 1000 is implemented by the AP 14, in an embodiment. For example, the method 1000 is implemented by the MAC processing unit 18 and/or by the PHY processing unit 20 of the AP 14, in an embodiment. In other embodiments, the method 1000 is implemented by other components of the AP 14, or is implemented by a suitable communication device other than the AP 14.

At block 1002, multiple uplink data units simultaneously transmitted by multiple client stations are received. In an embodiment, multiple data units 206 of FIGS. 2 and 3 are received. In an other embodiment, suitable data units different from the data units 206 of FIGS. 2 and 3 are received. In an embodiment, the multiple client stations are members of an MU-MIMO group, and the multiple data units are transmitted by the multiple client stations in respective spatial streams allocated to the client stations. In another embodiment, the multiple client stations are members of an OFDMA group, and the multiple data units are transmitted by the multiple client stations in OFDM channels allocated to the multiple client stations.

At block 1004, respective acknowledgment data units to acknowledge respective data units received at block 1002 are generated. In an embodiment, each respective acknowledgement data unit includes (i) an indication that the acknowledgement data unit is directed to a particular communication device of the multiple communication devices from which the uplink data units are received at block 1002 and (ii) acknowledgement information for the particular communication device. In an embodiment, the acknowledgement data units include respective control fields such as the control field 500 of FIG. 5. In an embodiment, the respective control fields included in the acknowledgement data units include respective BA control fields such as the BA control field 600 of FIG. 6 and respective BA/Ack information elements such as the BA/Ack information elements 700 of FIG. 7. In another embodiment, the acknowledgement data units include other suitable control fields and/or other suitable information elements that acknowledge receipt of the multiple data unit received at block 902.

At block 1006, an MU data unit that includes the respective acknowledgement data units generated at block 1004 is generated. In an embodiment and/or scenario, the MU data unit generated at block 1006 is an orthogonal frequency division multiple access (OFDMA) data unit that includes the respective acknowledgement data units in respective orthogonal frequency division multiplexing (OFDM) channels allocated to the multiple communication devices. In another embodiment and/or scenario, the MU data unit generated at block 1006 is an MU-MIMO data unit that includes the respective acknowledgement data units in respective spatial streams allocated to the multiple second communication devices. In an embodiment, the MU data unit 312 of FIG. 3 is generated at block 1006. In another embodiment, a suitable MU data unit different from the MU data unit 312 is generated at block 1006.

At block 1008, the MU data unit generated at block 1006 is transmitted to the multiple communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

In an embodiment, a method for simultaneously communicating with multiple communication devices in a wireless local area network includes receiving, at a first communication device, a plurality of uplink data units simultaneously transmitted by multiple second communication devices. The method also includes generating, at the first communication device, an acknowledgement data unit to acknowledge receipt of the multiple data units simultaneously transmitted by multiple second communication devices, wherein the acknowledgement data unit includes (i) an indication that indicates that the acknowledgement data unit is intended for multiple second communication devices and (ii) respective acknowledgement information for the multiple second communication devices. The method additionally includes causing the acknowledgement data unit to be transmitted from the first communication device to the multiple second communication devices.

In other embodiments, the method includes any suitable combination of one or more of the following features.

The multiple second communication devices are included in a multi-user multiple input multiple output (MU-MIMO) group.

Receiving, at the first communication device, a plurality of uplink data units simultaneously transmitted by multiple second communication devices comprises receiving a plurality of data units transmitted in respective spatial streams respectively allocated to the multiple second communication devices.

The multiple second communication devices are included in an orthogonal frequency division multiple access (OFDMA) group.

Receiving, at the first communication device, a plurality of uplink data units simultaneously transmitted by multiple second communication devices comprises receiving a plurality of data units simultaneously transmitted in respective orthogonal frequency division multiplexing (OFDM) channels allocated to the multiple second communication devices.

The acknowledgement data unit includes a broadcast receiver address, and wherein the broadcast receiver address serves as the indication that the acknowledgement data unit is intended for multiple second communication devices.

The respective acknowledgement information for the multiple second communication devices includes, for each of the multiple second communication devices, (i) a respective identifier associated with the second communication device and (ii) an indication of whether the acknowledgement data unit includes (a) an acknowledgement that acknowledges a single data unit received from the second communication device or (b) a block acknowledgement that acknowledges multiple data units received from the second communication device.

The respective identifier associated with the second communication device is an association identifier (AID) associated with the second communication device.

The respective identifier associated with the second communication device is a partial association identifier (AID) associated with the second communication device.

The respective acknowledgement information for the multiple second communication devices further includes, for at least one of the multiple second communication devices, an indication that the acknowledgement information correspond to the at least one second communication device includes multiple acknowledgements for data units corresponding to multiple traffic identifiers.

The method further includes selecting, at the first communication, one or more of (i) a data rate, (ii) modulation and coding scheme (MCS) and (iii) number of spatial streams (Nss) to be used for transmission of the acknowledgement data unit to the second communication devices, wherein the one or more of (i) a data rate, (ii) modulation and coding scheme (MCS) and (iii) number of spatial streams (Nss) are selected without considering corresponding one or more parameters of the received uplink data units.

The method further includes, prior to receiving the plurality of uplink data units simultaneously transmitted by multiple second communication devices, transmitting, by the first communication device, a control frame that prompts transmission of the plurality of uplink data units by the second communication devices.

In another embodiment a first communication device comprises a network interface having one or more integrated circuits. The one or more integrated circuits are configured to receive a plurality of uplink data units simultaneously transmitted by multiple second communication devices. The one or more integrated circuits are also configured to generate an acknowledgement data unit to acknowledge receipt of the multiple data units simultaneously transmitted by multiple second communication devices, wherein the acknowledgement data unit includes (i) an indication that indicates that the acknowledgement data unit is intended for multiple second communication devices and (ii) respective acknowledgement information for the multiple second communication devices. The one or more integrated circuits are additionally configured to cause the acknowledgement data unit to be transmitted from the first communication device to the multiple second communication devices.

In other embodiments, the first communication device includes any suitable combination of one or more of the following features.

The multiple second communication devices are included in a multi-user multiple input multiple output (MU-MIMO) group.

The one or more integrated circuits are configured to receive the plurality of data units transmitted in respective spatial streams respectively allocated to the multiple second communication devices.

The multiple second communication devices are included in an orthogonal frequency division multiple access (OFDMA) group.

The one or more integrated circuits are configured to receive the plurality of data units transmitted in respective orthogonal frequency division multiplexing (OFDM) channels allocated to the multiple second communication devices.

The acknowledgement data unit includes a broadcast receiver address, and wherein the broadcast receiver address serves as the indication that the acknowledgement data unit is intended for multiple second communication devices.

The respective acknowledgement information for the multiple second communication devices includes, for each of the multiple second communication devices, (i) a respective identifier associated with the second communication device and (ii) an indication of whether the acknowledgement data unit includes (a) an acknowledgement that acknowledges a single data unit received from the second communication device or (b) a block acknowledgement that acknowledges multiple data units received from the second communication device.

The respective identifier associated with the second communication device is an association identifier (AID) associated with the second communication device.

The respective identifier associated with the second communication device is a partial association identifier (AID) associated with the second communication device.

The respective acknowledgement information for the multiple second communication devices further includes, for at least one of the multiple second communication devices, an indication that the acknowledgement information correspond to the at least one second communication device includes multiple acknowledgements for data units corresponding to multiple traffic identifiers.

The one or more integrated circuits are further configured to select one or more of (i) a data rate, (ii) modulation and coding scheme (MCS) and (iii) number of spatial streams (Nss) to be used for transmission of the acknowledgement data unit to the second communication devices, wherein the one or more of (i) a data rate, (ii) modulation and coding scheme (MCS) and (iii) number of spatial streams (Nss) are selected without considering corresponding one or more parameters of the received uplink data units.

The one or more integrated circuits are further configured to, prior to receiving the plurality of uplink data units simultaneously transmitted by multiple second communication devices, transmit a control frame that prompts transmission of the plurality of uplink data units by the second communication devices.

In another embodiment, a method for simultaneously communicating with multiple communication devices in a wireless local area network includes receiving, at a first communication device, a plurality of uplink data units simultaneously transmitted by multiple second communication devices. The method also includes generating, at the first communication device, respective acknowledgment data units to acknowledge respective uplink data units received from the multiple second communication devices. The method additionally includes generating one of (i) an orthogonal frequency division multiple access (OFDMA) data unit that includes the respective acknowledgement data units in respective orthogonal frequency division multiplexing (OFDM) channels allocated to the multiple second communication devices or (ii) a multiuser multiple input multiple output (MU-MIMO) data unit that includes the respective acknowledgement data units in respective spatial streams allocated to the multiple second communication devices. The method further includes causing the generated one of (i) the OFDMA data unit or (ii) the MU-MIMO data unit to be transmitted from the first communication device to the multiple second communication devices.

In other embodiments, the method includes any suitable combination of one or more of the following features.

The multiple second communication devices are included in a multi-user multiple input multiple output (MU-MIMO) group.

The multiple second communication devices are included in a multi-user multiple input multiple output (MU-MIMO) group.

Receiving, at the first communication device, a plurality of uplink data units simultaneously transmitted by multiple second communication devices comprises receiving a plurality of data units transmitted in respective spatial streams respectively allocated to the multiple second communication devices.

The multiple second communication devices are included in an orthogonal frequency division multiple access (OFDMA) group.

Receiving, at the first communication device, a plurality of uplink data units simultaneously transmitted by multiple second communication devices comprises receiving a plurality of data units simultaneously transmitted in respective orthogonal frequency division multiplexing (OFDM) channels allocated to the multiple second communication devices.

The method further includes padding one or more of the respective acknowledgement data units to equalize lengths of the respective acknowledgement data units.

In still another embodiment, a first communication device comprises a network interface having one or more integrated circuits. The one or more integrated circuits are configured to receive a plurality of uplink data units simultaneously transmitted by multiple second communication devices. The one or more integrated circuits are also configured to generate respective acknowledgment data units to acknowledge respective uplink data units received from the multiple second communication devices. The one or more integrated circuits are additionally configured to generate one of (i) an orthogonal frequency division multiple access (OFDMA) data unit that includes the respective acknowledgement data units in respective orthogonal frequency division multiplexing (OFDM) channels allocated to the multiple second communication devices or (ii) a multi user multiple input multiple output (MU-MIMO) data unit that includes the respective acknowledgement data units in respective spatial streams allocated to the multiple second communication devices. The one or more integrated circuits are additionally configured to cause the generated one of (i) the OFDMA data unit or (ii) the MU-MIMO data unit to be transmitted from the first communication device to the multiple second communication devices.

In other embodiments, the first communication device includes any suitable combination of one or more of the following features.

The multiple second communication devices are included in a multi-user multiple input multiple output (MU-MIMO) group.

The one or more integrated circuits are configured to receive the plurality of data units transmitted by the multiple second communication devices using respective spatial streams respectively allocated to the multiple second communication devices.

The multiple second communication devices are included in an orthogonal frequency division multiple access (OFDMA) group.

The one or more integrated circuits are configured to receive the plurality of data units transmitted by the multiple second communication devices in respective orthogonal frequency division multiplexing (OFDM) channels allocated to the multiple second communication devices.

The one or more integrated circuits are further configured to pad one or more of the respective acknowledgement data units to equalize lengths of the respective acknowledgement data units.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously communicating with multiple communication
devices in a wireless local area network, the method comprising:
receiving, at a first communication device, a plurality of uplink data units simultaneously transmitted by multiple second communication devices of a multi-user multiple input multiple output (MU-MIMO) group or of an orthogonal frequency division multiple access (OFDMA) group;
generating, at the first communication device, an acknowledgement data unit to acknowledge receipt of the multiple data units simultaneously transmitted by multiple second communication devices, wherein the acknowledgement data unit includes (i) an indication that indicates that the acknowledgement data unit is intended for multiple second communication devices and (ii) respective acknowledgement information for the multiple second communication devices;
wherein the acknowledgement data unit includes a control field that includes a frame control field, a duration/id field, a receiver address field, a transmitter address field, a BA control field a BA/Ack information field, and a frame sequence check field;
wherein the indication that indicates that the acknowledgement data is intended for multiple second communication devices is in the BA/Ack information field.

2. The method of claim 1, wherein
the multiple second communication devices are included in a multi-user multiple input multiple output (MU-MIMO) group, and
receiving, at the first communication device, a plurality of uplink data units simultaneously transmitted by multiple second communication devices comprises receiving a plurality of data units transmitted in respective spatial streams respectively allocated to the multiple second communication devices.

3. The method of claim 1, wherein
the multiple second communication devices are included in an orthogonal frequency division multiple access (OFDMA) group, and
receiving, at the first communication device, a plurality of uplink data units simultaneously transmitted by multiple second communication devices comprises receiving a plurality of data units simultaneously transmitted in respective orthogonal frequency division multiplexing (OFDM) channels allocated to the multiple second communication devices.

4. The method of claim 1, wherein the acknowledgement data unit includes a broadcast receiver address, and wherein the broadcast receiver address serves as the indication that the acknowledgement data unit is intended for multiple second communication devices.

5. The method of claim 1, wherein the respective acknowledgement information for the multiple second communication devices includes, for each of the multiple second communication devices, (i) a respective identifier associated with the second communication device and (ii) an indication of whether the acknowledgement data unit includes (a) an acknowledgement that acknowledges a single data unit received from the second communication device or (b) a block acknowledgement that acknowledges multiple data units received from the second communication device.

6. The method of claim 5, wherein the respective identifier associated with the second communication device is an association identifier (AID) associated with the second communication device.

7. The method of claim 5, wherein the respective identifier associated with the second communication device is a partial association identifier (AID) associated with the second communication device.

8. The method of claim 1, further comprising, prior to receiving the plurality
of uplink data units simultaneously transmitted by multiple second communication devices, transmitting, by the first communication device, a control frame that prompts transmission of the plurality of uplink data units by the second communication devices.

9. A first communication device, comprising:
a network interface having one or more integrated circuits configured to
receive a plurality of uplink data units simultaneously transmitted by multiple second communication devices,
generate an acknowledgement data unit to acknowledge receipt of the multiple data units simultaneously transmitted by multiple second communication devices, wherein the acknowledgement data unit includes (i) an indication that indicates that the acknowledgement data unit is intended for multiple second communication devices;
wherein the acknowledgement data unit includes a control field that includes a frame control field a duration/id field, a receiver address field, a transmitter address field, a BA control field, a BA/Ack information field, and a frame sequence check field;
wherein the indication that indicates that the acknowledgement data is intended for multiple second communication devices is in the BA/Ack information field.

10. The first communication device of claim 9, wherein
the multiple second communication devices are included in a multi-user multiple input multiple output (MU-MIMO) group, and
the one or more integrated circuits are configured to receive the plurality of data units transmitted in respective spatial streams respectively allocated to the multiple second communication devices.

11. The first communication device of claim 9, wherein
the multiple second communication devices are included in an orthogonal frequency division multiple access (OFDMA) group, and
the one or more integrated circuits are configured to receive the plurality of data units transmitted in respective orthogonal frequency division multiplexing (OFDM) channels allocated to the multiple second communication devices.

12. The first communication device of claim 9, wherein the acknowledgement data unit includes a broadcast receiver address, and wherein the broadcast receiver address serves as the indication that the acknowledgement data unit is intended for multiple second communication devices.

13. The first communication device of claim 9, wherein the respective acknowledgement information for the multiple second communication devices includes, for each of the multiple second communication devices, (i) a respective identifier associated with the second communication device and (ii) an indication of whether the acknowledgement data unit includes (a) an acknowledgement that acknowledges a single data unit received from the second communication device or (b) a block acknowledgement that acknowledges multiple data units received from the second communication device.

14. The first communication device of claim 13, wherein the respective identifier associated with the second communication device is an association identifier (AID) associated with the second communication device.

15. The first communication device of claim 13, wherein the respective identifier associated with the second communication device is a partial association identifier (AID) associated with the second communication device.

* * * * *